United States Patent [19]

Brent Jr. et al.

[11] Patent Number: 4,900,713

[45] Date of Patent: Feb. 13, 1990

[54] STABILIZING SPENT HYDROTREATING CATALYST FOR REPROCESSING OR STORAGE

[75] Inventors: Fred D. Brent Jr.; Richard G. Nelson, both of Port Neches; William A. Ruff, Beaumont, all of Tex.

[73] Assignee: Texaco, Inc., White Plains, N.Y.

[21] Appl. No.: 233,799

[22] Filed: Aug. 19, 1988

[51] Int. Cl.$^4$ ............... B01J 31/34; B01J 31/06; B01J 27/051

[52] U.S. Cl. ............... 502/439; 206/524.4; 502/20; 502/51; 502/52; 502/159; 502/173; 502/220; 502/221; 502/301; 502/313; 502/500; 502/516

[58] Field of Search ............... 502/20, 22, 29, 52, 502/159, 172, 173, 33, 500, 501, 150, 516, 517, 51, 301, 313, 220, 221, 439; 206/524.4, 524.8; 220/88 R, 93

[56] References Cited

U.S. PATENT DOCUMENTS

| | | | |
|---|---|---|---|
| 1,127,911 | 2/1915 | Morey | 206/524.8 |
| 1,187,775 | 6/1916 | Oswald et al. | 502/173 |
| 2,598,170 | 5/1952 | Huebotter | 206/524.4 |
| 3,838,066 | 9/1974 | Lovell | 502/52 |
| 4,090,980 | 5/1978 | Carter et al. | 502/500 |
| 4,138,518 | 2/1979 | Sammak et al. | 428/95 |
| 4,176,092 | 11/1979 | Birkenstock et al. | 502/301 |
| 4,268,414 | 5/1981 | Kawakami et al. | 502/33 |
| 4,402,736 | 9/1983 | Graham | 75/0.5 R |
| 4,424,291 | 1/1984 | Leake et al. | 524/47 |
| 4,642,196 | 2/1987 | Yan | 252/88 |
| 4,650,495 | 3/1987 | Yan | 44/1 G |

OTHER PUBLICATIONS

R. W. Goerlich, C. A. Vuitel and J. G. Welch (CRT Int.) 1987, National Petroleum Refiners Association Annual Meeting, Mar. 1987, Paper No. AM-87-74:15p.

Primary Examiner—Paul E. Konopka
Attorney, Agent, or Firm—Jack H. Park; Kenneth R. Priem; Richard A. Morgan

[57] ABSTRACT

A method of stabilizing pyrophoric hydrotreating catalyst drums has been discovered. The dry catalyst is introduced into drums which have been purged with an inert gas such as nitrogen or carbon dioxide. A continuous layer of gelatinized starch is applied to the top of the catalyst, sealing it from air. The drum lid is clamped on and the catalyst is stored or transported. The gelatinized starch seal does not impair the catalyst for regeneration or metals reclaiming.

8 Claims, No Drawings

STABILIZING SPENT HYDROTREATING CATALYST FOR REPROCESSING OR STORAGE

BACKGROUND OF THE INVENTION

1. Field of the Invention

The invention relates to an improved method for stabilizing pyrophoric catalyst. The method relates to sealing the catalyst in containers by means of a gelatinized starch seal. The invention also relates to an improved method of regenerating catalyst or reclaiming metallic components from spent hydrotreating catalyst.

2. Description of Other Relevant Methods in the Field

Spent hydrotreating catalyst are pyrophoric when dumped from a reactor. The spent catalyst is unpredictable as to when it will spontaneously combust on exposure to air. Some catalyst begins to burn immediately; some catalyst begins to burn after a few days exposure; while some catalysts may begin to burn only with time after dumping in a hazardous waste dump. Piles of ambient temperature catalyst have been later observed to smolder, reaching temperature of 500° F. The pyrophoric nature of hydrotreating catalyst has been attributed to the exothermic oxidation of iron sulfides deposited on the catalysts.

Because the relative propensity of these catalysts to spontaneously ignite is unknown, it is necessary to take full precautions when handling all such catalyst. Full precautions include minimizing contact with air during catalyst handling.

Such precautions have included contact with water or steam. It has also been suggested that a silicone base spray be applied to the catalyst. In the case of water treatment the precaution is temporary. In the case of silicone spray the precaution is expensive. Unfortunately, these precautions degrade the catalyst for regeneration or metal reclamation.

The stabilizing of pyrophoric material is known in the art.

Applicants personal knowledge of the state of the art is that pyrophoric hydrotreating catalyst is dumped into air-tight sealable 52 gallon drums or four drum size bins. A piece of dry ice is placed in each container to generate an inert gas and thereby exclude air before sealing the container. The containers are then shipped for regeneration, metals reclamation or burial as hazardous waste.

T. Y. Yan U.S. Pat. No. 4,650,495 teaches a method for stabilizing heated and dried low rank coal. The method concerns treating the coal particles with a pyrophoric protection fluid. The pyrophoric protection fluid comprises petroleum residual oil, heavy oil, a mixture of tall oil and rosin, gelatinized starch or combination thereof in an amount of about 0.01 weight percent to about 5 weight percent of the coal particles. The method can be used in other applications where dust such as grain dust and wood dust presents a fire and explosion hazard. In one embodiment, gelatinized starch is preferred, T. Y. Yan U.S. Pat. No. 4,642,196 teaches a method for controlling dust and spontaneous combustion in the drying, handling, transporting and storing of coal. The dust is a result of degradation caused partly by the oxidation of mineral matter, particularly iron sulfide contained in cleavage veins of coal and similar fuels. The method concerns spraying an inhibiting amount of an aqueous solution consisting essentially of gelatinized starch over the coal. All types of starch are applicable including starch derived from corn, wheat, sorghum, rice, barley, potato, tapioca and cassava. Starches rich in amylopectin are more effective, e.g. corn, barley and rice derived starches. It was found that starch solutions were significantly more effective than petroleum resids in preventing and controlling dust. It was also found that coal so treated could be combusted without undesirable combustion products such as salts.

C. H. Leale et al U.S. Pat. No. 4,424,291 teaches an adhesive for corrugated paperboard comprising 2 to 95 weight percent gelatinized starch.

R. K. Graham U.S. Pat. No 4,402,736 teaches a method of agglomerating mineral fines such as iron ore fines by means of pelletizing the fines with gelatinized starch.

E. G. Sammak et al U.S. Pat. No. 4,138,518 teaches a textile composite and method for making the same. The composite comprises gelatinized starch. The patent also teaches fire retardant textile coatings.

SUMMARY OF THE INVENTION

The invention is a method for stabilizing pyrophoric catalyst in a container. The method comprises placing the oil-freed catalyst in the container and then forming an air-tight seal over the catalyst. The seal comprises gelatinized starch.

The stabilized catalyst is safe for shipment and storage. If the catalyst is regenerated or processed for metals recovery, the gelatinized starch seal is peeled away, leaving the catalyst unimpaired for such use.

DESCRIPTION OF THE PREFERRED EMBODIMENTS

Spent hydrotreating catalysts is typically freed of oil in the reactor by means of sweeping with heated gases such as hydrogen, fuel gas, or steam for a period of time based on experience sufficient to remove surface oil. Catalyst so treated is referred to the art as oil free or as dry, even though it may contain small quantities of surface oil or contain oil in the pores or acquire moisture.

The dry catalyst is dumped into containers such as 52 gallon drums or four drum size bins which have been purged of air with inert gas such as nitrogen or carbon dioxide. Dry ice is a preferred source of carbon dioxide because it is easily handled at a remote location such as at a reactor in a refinery and presents minimal safety concern from suffocation.

A quantity of dry starch is mixed with water to produce a viscous gelatinized starch. All types of vegetable starch are useful. These include starch derived from potato, tapioca, corn, waxy corn, wheat sorghum, rice, barley, cassava and any combination or mixture thereof. Corn, barley, and rice starches are preferred for retarding fire. Corn starch is most preferred for economy.

The gelatinized starch is applied over the surface of the catalyst in the container. The gelatinized starch is easily applied manually with a pail or shovel. The amount is not critical but should be in an amount to form a continuous air-tight seal with the container. If the container is to remain upright, seals of, for example, one-sixteenth inch to one-quarter inch are effective. If a drum is to be turned on its side and rolled, a thicker seal is necessary. For example, the entire void space in the drum between the catalyst level and the drum lid may be filled with gelatinized starch. This may require a number of inches of gelatinized starch. The barrel lid is then clamped on leaving no void space in the drum to prevent catalyst shifting which could break the seal.

The containers so sealed are safe for transport to a hazardous waste dump. It is of course understood that containers known to be suitable for this purpose are used. These containers are made of steel with a clamp on lid. If desired, a continuous coating of gelatinized starch can be applied to the inside of the drums should the air tight quality of the containers be questioned. The containers are labeled by means of a painted on warning as to the pyrophoric nature of the contents.

If the container are shipped to a regenerator or metals reclaimer, care consistent with the pyrophoric nature of the catalyst should be taken when opening the barrels. The pyrophoric nature has be attributed to the iron sulfide on the catalyst. The iron sulfide content is retained undiminished with time in the inert atmosphere and the pyrophoric nature is retained.

A catalyst regeneration comprises the oxidation of carbon and sulfur contaminants. This is carried out either in the reactor or off site. In the regeneration, the catalyst is first stripped with an inert stripping gas to remove residual hydrocarbon and moisture. The catalyst is then subjected to a controlled oxidation, usually with a temperature moderating gas such as steam. In an additional procedure, termed a rejuvenation, tramp metal contaminants such as lead, nickel, vanadium, sodium and iron are removed.

A number of metal reclamation processes are known in the art. One described by R. W. Goerlich, C. A. Vuitel and J. G. Welch (CRT Int.) 1987 National Petroleum Refiners Association Annual Meeting, March 1987, Paper No. AM-87-74:15p describes a two stage high temperature and pressure caustic leaching process which dissolves metals and alumina. In the process the catalyst is powdered, slurried and fed to a first stage autoclave where molybdenum and vanadium are removed, sulfur is converted to sulfates and hydrocarbons oxidized. Further processing of the aqueous stream yields molybdenum sulfide and vanadium pentoxide. In a second stage leached alumina is converted to soluble sodium aluminate along with the remaining vanadium and molybdenum. The sodium aluminate is precipitated as pure alumina trihydrate. The remaining nickel and cobalt cake is smelted for recovery of metals.

While particular embodiments of the invention have been described, it is well understood that the invention is not limited thereto since modifications may be made. It is therefore contemplated to cover by the appended claims any such modifications as fall within the spirit and scope of the claims.

What is claimed is:

1. A method for stabilizing dry pyrophoric catalyst in a container comprising:
    forming an air-tight seal over the catalyst, the seal comprising gelatinized starch.

2. The method of claim 1 wherein the starch is derived from a source selected from the group consisting of potato, tapioca, corn, waxy corn, wheat, sorghum, rice, barley, cassava and combinations thereof.

3. The method of claim 1 wherein the catalyst is hydrotreating catalyst.

4. A method for stabilizing dry pyrophoric catalyst in a container comprising:
    purging the container with an inert gas,
    introducing the pyrophoric catalyst to the container,
    forming an air-tight seal over the catalyst, the seal comprising gelatinized starch.

5. The method of claim 4 wherein the starch is derived from a source selected from the group consisting of potato, tapioca, corn, waxy corn, wheat, sorghum, rice, barley cassava and combination thereof.

6. The method of claim 4 wherein the inert gas is selected from the group consisting of nitrogen and carbon dioxide.

7. The method of claim 4 wherein purging comprises introducing dry ice to the container.

8. The method of claim 4 wherein the catalyst is hydrotreating catalyst.

* * * * *